United States Patent [19]

Arikawa

[11] Patent Number: 4,805,967
[45] Date of Patent: Feb. 21, 1989

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 911,103

[22] Filed: Sep. 24, 1986

[30] Foreign Application Priority Data

Sep. 26, 1985 [JP] Japan .................................. 60-212848

[51] Int. Cl.[4] .......................... B60T 8/40; B60T 13/70; B60T 8/88
[52] U.S. Cl. .................................... 303/116; 303/113; 303/92; 303/10
[58] Field of Search ............... 188/181 A; 303/10, 92, 303/113, 103, 105, 110, 111, 115, 116, 119

[56] References Cited

U.S. PATENT DOCUMENTS

| 3,532,391 | 10/1970 | Klein | 303/119 |
| 3,674,317 | 7/1972 | Mangold | 303/118 |
| 3,756,666 | 9/1973 | Leiber | 303/116 X |
| 3,866,983 | 2/1975 | Kondo | 303/119 |
| 3,907,377 | 10/1975 | Mayer | 303/21 F |
| 3,980,346 | 10/1976 | Leiber | 303/100 |
| 4,387,934 | 6/1983 | Farr | 303/116 |
| 4,418,966 | 12/1983 | Hattwig | 303/119 |
| 4,451,096 | 5/1984 | Gygax | 303/109 |
| 4,603,920 | 8/1986 | Otguki et al. | 303/116 |
| 4,750,788 | 6/1988 | Seibert et al. | 303/111 |

FOREIGN PATENT DOCUMENTS

| 3542689 | 6/1987 | Fed. Rep. of Germany | 303/116 |
| 0230853 | 12/1984 | Japan | 303/116 |

Primary Examiner—Andres Kashnikow
Assistant Examiner—Timothy Newholm
Attorney, Agent, or Firm—Jones, Day, Reavis & Pogue

[57] ABSTRACT

An anti-skid control apparatus for a vehicle braking system includes a fluid pressure control valve arranged between a master cylinder and a wheel cylinder of a wheel brake apparatus, and receiving instructions from a control unit for judging or measuring skid conditions of wheels to control brake fluid pressure of the wheel cylinder. The apparatus includes a hydraulic reservoir for reserving brake fluid discharged through the fluid pressure control valve from the wheel cylinder to lower the brake fluid pressure of the wheel cylinder with the control of the fluid pressure control valve and a fluid pressure pump for pressurizing the discharged brake fluid of the hydraulic reservoir and supplying the pressurized brake fluid into a conduit between the master cylinder and the wheel cylinder. The fluid pressure control valve is changeable over into at least two positions, making the master cylinder and the wheel cylinder communicate with each in the first of the two positions, and making the wheel cylinder and the hydraulic reservoir communicate with each other in the second position of the two positions, while making the master cylinder and the wheel cylinder interrupt each other. The apparatus also includes members for circulating the brake fluid discharged from the wheel cylinder in the second position of the fluid pressure control valve through a path such as the outlet of the fluid pressure pump through the hydraulic reservoir and then through the inlet of the fluid pressure pump.

9 Claims, 6 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system having a least one wheel and a brake for the wheel in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is released, brake fluid discharged through a fluid pressure control valve device from the wheel cylinder of the brake is returned to a pressure fluid supply conduit connected to a master cylinder by a fluid pump.

2. Description of the Prior Art

Recently, various kinds of skid control systems have been developed for a vehicle having at least one wheel and a brake for the wheel, by which skid control operation for the wheel is performed to avoid a locked wheel condition and obtain good braking performance on any road. In any of the skid control systems, the rotational condition or skid condition of the wheel such as deceleration, slip and acceleration is measured by the control unit which receives the detecting signal of the wheel speed sensor which is associated with the wheel for the detecting the rotational speed of the wheel. The brake fluid pressure to the brake for the wheel is controlled on the basis of the measurement of the control unit.

Methods for measuring the rotational condition or skid condition of the wheel can be roughly classified into three. In the first method, slip of the wheel is obtained from the vehicle speed and the wheel speed, and the obtained slip of the wheel is compared with a predetermined slip. In the second method, acceleration or deceleration of the wheel is obtained, and the obtained acceleration or deceleration of the wheel is compared with a predetermined acceleration or deceleration. And in the third method, slip and acceleration or deceleration of the wheel are obtained from the vehicle speed and wheel speed, and the obtained slip and acceleration or deceleration of the wheel are compared with the predetermined slip and acceleration or deceleration.

A brake fluid pressure control apparatus is arranged between a master cylinder as a brake pressure generating member and the brake for the wheel. Control signals from the control unit as the measurement result are supplied to the brake fluid pressure control apparatus for increasing and decreasing, or increasing, maintaining at constant, and decreasing the brake pressure to the brake for the wheel.

One example of the brake fluid pressure control apparatus includes a brake fluid pressure control valve device to which the control signals from the control unit are supplied, to control the brake fluid pressure to the wheel cylinder of the brake for the wheel, a hydraulic reservoir for reserving the brake fluid discharged through the brake fluid pressure control valve device from the wheel cylinder of the brake, when relieved, and a fluid pump for returning the brake fluid from the hydraulic reservoir into the pressure fluid supply conduit connecting the master cylinder and the brake fluid pressure control valve device.

In the example of the brake fluid pressure control apparatus, the brake fluid from the wheel cylinder of the brake is discharged into the hydraulic reservoir to relieve the brake for the wheel, and it is returned to the pressure fluid supply conduit by the fluid pump. When the brake for the wheel is released, the brake fluid pressure control valve device is set to reduce the brake pressure, and therefore to cut off the communication between the master cylinder and the wheel cylinder of the brake for the wheel. Accordingly, the fluid pressure of the brake fluid returned by the fluid pump is applied to the piston of the master cylinder connected to the brake pedal which is operated by the foot of the driver. The brake pedal is pushed against the driver's foot. Thus, whenever the brake fluid pressure to the wheel cylinder of the brake changes, the piston of the master cylinder is displaced backward and forward. The driver senses that the feels disagreeable. The pedal feeling is bad.

SUMMARY CF THE INVENTION

An object of this invention is to provide an anti-skid control apparatus for vehicle braking system in which, the pedal feeling of the driver, when the driver treads the brake pedal, is good.

A further object of this invention is to provide an anti-skid control apparatus for vehicle braking system which is simple in construction.

In accordance with an aspect of this invention, an anti-skid control apparatus for vehicle braking system: includes (A) fluid pressure control valve means being arranged between master cylinder means and wheel cylinder means of wheel brake apparatus, and receiving instructions from a control unit for judging or measuring skid conditions of wheels to control brake fluid pressure of said wheel cylinder means; (B) hydraulic reservoir means for reserving brake fluid discharged through said fluid pressure control valve means from said wheel cylinder means to lower said brake fluid pressure of the wheel cylinder means with the control of said fluid pressure control valve means; (C) fluid pressure pump means for pressurizing the discharged brake fluid of said hydraulic reservoir means and supplying said pressurized brake fluid into a conduit between said master cylinder means and said wheel cylinder means; (D) said fluid pressure control valve means being changeable over into at least two positions, making said master cylinder means and said wheel cylinder means communicate with each in the first of said two positions, and making said wheel cylinder means and said hydraulic reservoir means to communicate with each other in the second position of said two positions, while making said master cylinder means and said wheel cylinder means to interrupt from each other therein; and (E) means for circulating said brake fluid discharged from said wheel cylinder means in said second position of the fluid pressure control valve means through a path such as the outlet of said fluid pressure pump means through said hydraulic reservoir and through the inlet of said fluid pressure pump means.

The foregoing and other objects, features, and advantages of the present invention will be more readily understand upon consideration of the following detailed description of the preferred embodiments of the invention, taken in conjunction with the accompanying drawings.

DESCRIPTION OF THE PREFERRED EMBODIMENTS

Figure 1:
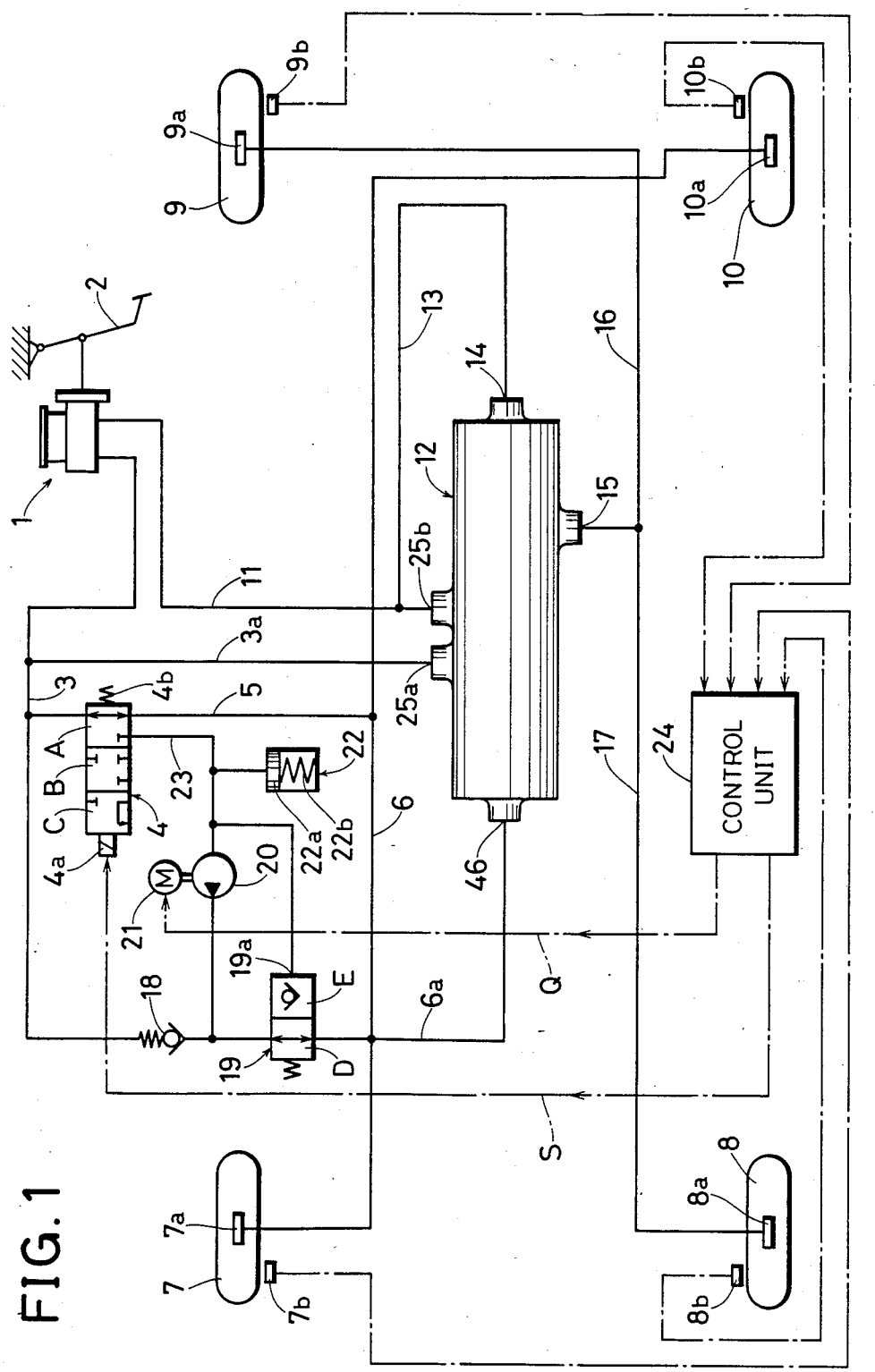
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 7 through a conduit 3, and an electromagnetic three position valve 4 and conduits 5 and 6. The conduit 3 is further connected through a check valve 18 and a controllable check valve 19 to the wheel cylinder 7a. A discharge opening or outlet opening of a fluid pressure pump 20 is connected to the connection point between the check valve 18 and the controllable check valve 19. Although the fluid pressure pump 20 is schematically shown, it has a well-known construction, and includes check valves (not shown) at the inlet and outlet sides. The not shown check valves permit fluid to flow only in the leftward direction, in FIG. 1. The fluid pump 20 is driven by an electric motor 21. A discharge opening of the valve 4 is connected through a conduit 23 to a hydraulic reservoir 22. The hydraulic reservoir 22 include a piston 22a slidably fitted to a casing and a relatively weak spring 22b. A reserving chamber of the reservoir 22 is connected to a suction opening of the fluid pressure pump 20. It is further connected to a control port 19a of the controllable check valve 19.

The conduit 6 is further connected to a wheel cylinder 10a of a left rear wheel 10. Thus, the wheel cylinders 7a and 10a of the wheels 7 and 10 are controlled in common by the valve 4. A conduit 3a branched from the conduit 3 is connected to a connecting port 25a of a valve apparatus 12 to be described hereinafter in detail. Another fluid pressure chamber of the tandem master cylinder 1 is connected to another connecting port 25b of the valve apparatus 12 through a conduit 11. A conduit 13 branched from the conduit 11 is connected through an input port 14 of the valve apparatus 12, an output port 15 thereof, and a conduit 16 to a wheel cylinder 9a of a right rear wheel 9.

The conduit 16 is further connected through a conduit 17 to a wheel cylinder 8a of a left front wheel 8. Thus, the wheel cylinders 8a and 9a of the left front wheel 8 and right rear wheel 9 are controlled in common by the valve apparatus 12.

Wheel speed sensors 7b, 8b, 9b and 10b are associated with the wheels 7, 8, 9 and 10 respectively, and they generate pulse signals having frequencies proportional to the rotational speeds of the wheels 7, 8, 9 and 10. The pulse signals of the wheel speed sensors are supplied to a control unit 24. The control unit 24 has a well-known circuit. On the basis of the detecting outputs of the wheel speed sensors 7b, 8b, 9b, and 10b, the skid condition or rotational condition of the wheels, namely wheel speeds of the wheels, approximate vehicle speed, slips thereof, and accelerations or decelerations thereof are calculated or measured by the control unit 24. A control signal S as the calculation or measurement results is generated from the control unit 24, and is supplied to a solenoid portion 4a of the valve 4. Dashed lines represent electric lead wires.

Although schematically shown, the electromagnetic valve 4 has a well-known construction. When the control signal S is "0", the valve 4 takes a first position A for increasing the brake pressure to the wheel. In the first position A, the master cylinder side and the wheel cylinder (7a)(10a) side are made to communicate with each other. When the control signal S is "½", the valve 4 takes a second position B for maintaining the brake pressure to the brake at constant. In the second position B, the communications between the master cylinder side and the wheel cylinder side, and between the wheel cylinder side and the reservoir side are interrupted. When the control signal S is "1", the valves 4 takes a third position C for decreasing the brake pressure to the brake. In the third position C, the communication between the master cylinder side and the wheel cylinder side is interrupted, while the communication between the wheel cylinder side and the reservoir side is made. The brake fluid is discharged through the conduit 23 into the reservoir 22 from the wheel cylinders 7a and 10a.

The control unit 24 further generates a drive signal Q, which is applied during the skid control operation. The drive signal Q is supplied to the motor 21.

The controllable check valve 19 normally takes a position D as shown, and makes both sides communicate with each other. When the fluid pressure of the control port 19a, and therefore that of the fluid pressure pump 20, become higher than a predetermined valve, the valve 19 is changed over into a position E, where it functions as a check valve which permits fluid to flow only in the direction extending from the wheel cylinder (7a) side towards the master cylinder side.

Figure 2:
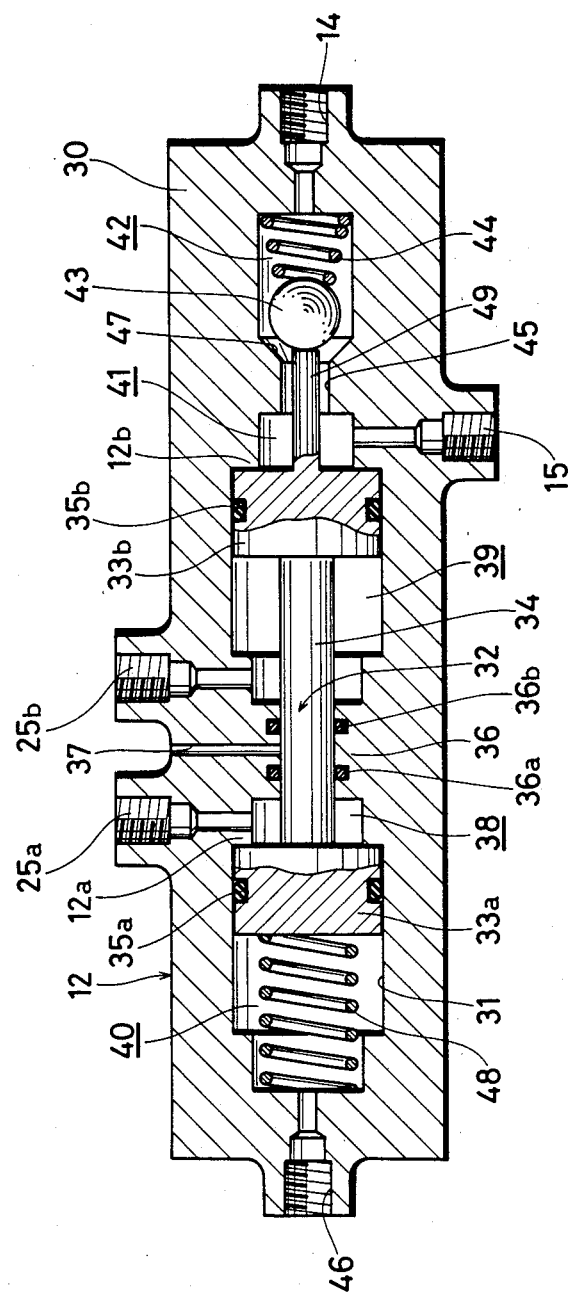
FIG. 2 is an enlarged cross-sectional view of a valve apparatus in FIG. 1.

Next, the details of the valve apparatus 12, to which the brake fluid pressures are applied from the wheel cylinder 7a of the front wheel 7 and the master cylinder, will be described with reference to FIG. 2.

A stepped through hole 31 is axially formed in a casing 30 for the valve apparatus 12. A piston 32 is slidably fitted into the stepped through hole 31, and it consists of a pair of larger-diameter portions 33a and 33b, a smaller-diameter portion 34 formed between the larger-diameter portions 33a and 33b, and a rod portion 49 formed out-wardly from the one larger-diameter portion 33b. The larger-diameter portions 33a and 33b are provided with seal rings 35a and 35b. A control chamber 40 and a master cylinder pressure chamber 38 are formed at both sides of the other larger-diameter portion 33a. An output chamber 41 and another master cylinder pressure chamber 39 are formed at both sides of the one larger-diameter portion 33b. The master cylinder pressure chambers 38 and 39 communicate with the fluid pressure generating chambers of the master cylinder 1 through connecting holes 25a and 25b. When both of the two conduit systems are in order, the fluid pressures of the master cylinder pressure chambers 38 and 39 are equal to each other. Accordingly, the forces acting on the piston 32 cancel with each other. The smaller-diameter portion 34 is slidably fitted to a central hole made in a partition 36 of the casing 30, sealed with seal rings 36a and 36b. A space between the seal rings 36a and 36b communicates with the atmosphere through a vent 37.

The piston 32 is urged rightwards by a spring 48 compressed in the control chamber 40. The original position of the piston 32 is determined by the contact of its larger-diameter portion 33a or 33b with a stepped portion 12a or 12b of the inner wall of the casing 30. The control chamber 40 communicates always with the wheel cylinders 7a and 10a through a control port 46 and conduits 6a and 6 connected to the control port 46.

The rod portion 49 of the piston 32 extends normally through the output chamber 41 and a smaller-diameter portion 45 of the stepped hole 31 into the input chamber 42 in which the top end of the rod portion 49 contacts a valve ball 43 urged leftwards by a spring 44, and separates the valve ball 43 from valve seat 47. The input chamber 42 communicates always with one fluid pressure generating chamber of the tandem master cylinder through the input port 14 and the conduits 13 and 11. The output chamber 41 communicates always with the output port 15 and the conduits 17 or 16 with the wheel cylinders 8a and 9a.

Next, there will be described the operations of the above-described apparatus.

It is assumed that the vehicle provided with the above-described apparatus runs substantially at a constant speed. The respective parts are located at the shown positions. The brake pedal 2 is rapidly trodden. Pressurized fluid is supplied from the master cylinder 1 to the wheel cylinders 7a and 10a of the wheels 7 and 10 through the conduit 3, the valve 4a and the conduits 5 and 6. Further, it is supplied to the wheel cylinders 8a and 9a of wheels 8 and 9 through the conduits 11 and 13, the input port 14, the output port 15 in the valve apparatus 12, and the conduits 16 and 17. Thus, the wheels 7, 8, 9 and 11 are braked.

The fluid pressures of the fluid pressure generating chambers of the master cylinder 1 rise substantially at the same rate. Accordingly, the pressures of the master cylinder pressure chambers 38 and 39 are substantially equal to each other in the valve apparatus 12. Further, the pressures of the output chamber 42 and control chamber 40 when the valve ball 43 is separated from the valve seat 47, are substantially equal to each other. Accordingly, the piston 32 is not moved, and remains positioned at the neutral position shown.

In the above-described manner, all of the wheels 7 to 10 are braked. It is now assumed that all of the wheels 7 to 10 are put into the skid conditions. For example, the slips of the wheels 7 to 10 become higher than the predetermined slip valve. Or it is assumed that any one of the wheels 7 to 10 is put into the skid condition.

The control signals becomes the level "1" of the two levels "0" and "1" from the control unit 24. The motor drive signal Q becomes "1" therewith. The valve 4 is changed over into the position C. The fluid pressure pump 20 is driven with the motor 21.

The master cylinder 1 side and the wheel cylinder 7a, 10a side are disconnected from each other, while the wheel cylinder 9a, 10a side and the reservoir 22 side is made to communicate with each other. Thus, the pressurized fluid is discharged from the wheel cylinders 7a and 10a into the reservoir 22 through the conduits 6, 5 and 23. The fluid discharged into the reservoir 22 is, at once, drawn by the fluid pressure pump 20 and fed to the controllable check valve 19 by it. Since the controllable check valve 19 is put at the position D, the brake fluid discharged from the fluid pressure pump 19 flows to the conduit 6, and further flows into the reservoir 22 through the conduits 5 and 23.

Thus, the brake fluid circulates through the path as the fluid pressure pump 20 through the controllable check valve 19 and through the conduits 6, 5 and 23 the fluid pressure pump 20. The check valve 18 has its own valve-opening pressure. And the fluid pressure of the master cylinder 1 has become considerably high. Accordingly, the fluid discharged from the fluid pressure pump 20 does not flow to the master cylinder 1 side. It circulates through the above-described flow path exhibiting no resistance except the resistance of the conduits. In other words, the discharging pressure of the fluid pressure pump 20 does not act on the master cylinder 1. Accordingly neither kick-back action nor pedal reaction is imported to the brake pedal 2. This, the pedal feeling is good.

In the above-described manner, the fluid pressure of the wheel cylinders 7a and 10a is decrease. It is applied to the control chamber 40 of the valve apparatus 12 through the control port 46 thereof. Accordingly the fluid pressure of the control chamber 40 also decreases. On the other hand, the fluid pressure of the output chamber 41 increases in the valve apparatus 12. Accordingly the piston 32 is moved leftwards. Thus, the valve ball 43 comes to contact with the valve seat 47, so that the input chamber 42 and the output chamber 41 are interrupted from each other. Since the fluid pressure of the chamber 40 further decreases, the piston 32 is further moved leftwards. The volume of the output chamber 41 interrupted from the input chamber 42 increases. The fluid pressure of the wheel cylinders 8a and 9a communicating with the output chamber 41 through the output port 15 and the conduits 16 and 17 decreases with the increase of the volume of the output chamber 41.

Thus, the fluid pressure of the wheel cylinders 8a and 9a in the one conduit system is decreased in accordance with that of the wheel cylinders 7a and 10a in the other conduit system. Accordingly, the braking forces of all of wheels 7 to 10 are decreased.

When the control unit 24 judges that the slips of all of the wheels 7 to 10 become lower than the predetermined value, the control signal S changes alternately as "$\frac{1}{2}$", "1", "$\frac{1}{2}$", "1" ... Thus, the valve 4 is changed over alternately into the position B or C.

In the position C, the braking force of the wheel is decreased as above described. In the position B, the master cylinder 1 side is interrupted from the wheel cylinder 7a and 10a, side, and the wheel cylinder 7a and 10a side is interrupted from the reservoir 22 side. Accordingly, the pressurized fluid from the fluid pressure pump 20 is supplied through the controllable check valve 19 to the wheel cylinders 7a and 10a without circulation. The fluid pressure of the wheel cylinders 7a and 10a rises. However, the valve 4 is at once changed over into the position C. The fluid pressure of the wheel cylinders 7a and 10a is decreased. Again, the valve 4 is, at once, changed over into the position B to raise the fluid pressure of the wheel cylinders 7a and 10a. When the period of the above change-over between the positions B and C is considerably short, the fluid pressure of the wheel cylinders 7a and 10a can be made substantially at constant. Thus, the braking force of all of the wheels 7 to 10 can be made substantially at constant.

When the wheel speeds of all of the wheels 7 to 10 become sufficiently high, and so the accelerations of the wheels 7 to 10 become higher than the predetermined value, the acceleration signal causes the control unit 24 to change the control signal S to the level "½" and maintain it so. The valve 4 is changed over into the position B. The pressurized fluid from the fluid pressure pump 20 is supplied through the controllable check valve 19 to the wheel cylinders 7a and 10a. Thus the fluid pressure of the wheel cylinders 7a and 10a increases. When the rotational speed of the motor 21 is suitably selected, the fluid pressure of the wheel cylinders 7a and 10a can be increased more slowly than in the case where the pressurized fluid is supplied directly from the master cylinder 1 in the position A of the valve 4.

When the acceleration signal disappears, the control signal S from the control unit 24 again becomes "1". Thus, the braking forces of the wheels 7 to 10 are decreased.

The above-described operations are repeated during the anti-skid control operation. Suppose first that the frictional coefficient of the road is relatively high. Now, it is assumed that the frictional coefficient of the road, on which the vehicle is running, becomes relatively low, while the brake is operated. At that time, the fluid pressure of the wheel cylinders 7a to 10a should be decreased much. Accordingly, much pressurized fluid is discharged into the reservoir 22. The piston 22a is moved much in the reservoir 22. The spring 22b is much compressed. Accordingly, the fluid pressure of the reservoir chamber is increased in the reservoir 22, and it becomes higher than the predetermined value. Thus, the controllable check valve 19 is changed over into the position E. Accordingly, the pressurized fluid from the fluid pressure pump 20 drawing from the reservoir 22 opens the check valve 18 and is returned to the master cylinder, without circulation. Of course, before the fluid pressure of the reservoir chamber of the reservoir 22 becomes higher than the predetermined value, the pressurized fluid from the pressure fluid pump 20 circulates in the above described manner, since the controllable check valve 19 is put at the position D.

While the vehicle is running on the road having a relatively high coefficient of friction (so-called high-µ road), no kick-back is imparted to the depressed brake pedal. However, when the frictional coefficient of the road becomes relatively low (low-road, for example, icy road), some kick back is imparted to the depressed brake pedal 2. Thus, the so-called H - L jumping phenomenon occurs. However, since the H - L jumping phenomenon seldom occurs, there is practically little problem.

When the brake pedal 2 is released during the anti-skid control operation or during the change-over of the valve 4 into the position B or C, the pressurized fluid is returned from the wheel cylinders 7a and 10a into the master cylinder 1 through the controllable check valve 19 and the check valve 18.

Next, there will be described the case that any one, for example, the conduit 3 side, of the two conduit systems fails.

In that case, the fluid pressures of the one master cylinder pressure chamber 38 and control chamber 40 are zero, while those of the other master cylinder pressure chamber 39 and output chamber 41 rise. Accordingly, the piston 32 is maintained at the position shown.

When the failure occurs during the anti-skid control operation, the piston 32 is moved rightwards, and takes the position shown. Accordingly, the ball valve 43 remains separated from the valve seat 47. The one fluid pressure generating chamber of the master cylinder 1 is maintained at the communicating state with the wheel cylinder 8a and 9a through the valve apparatus 12. The braking forces of the right conduit system can be securely obtained.

When the conduit 11 side fails, the fluid pressure of the wheel cylinders 7a and 10a can rise irrespective of the valve apparatus 12. Thus, the braking forces can be securely obtained without any problem.

Next, there will be described an apparatus according to a second embodiment of this invention with reference to FIG. 3. Parts in FIG. 3 which correspond to those in FIG. 1 are denoted by the same reference numerals, the description of which will be omitted.

Cut-off valves 50a and 50b are arranged in the conduits 6 and 17, respectively. Further, the master cylinder 1 is connected to the wheel cylinders 7a and 8a through conduits 3b and 3c. Check valves 52a and 52b are arranged in the conduits 3b and 3c, which permit brake fluid to flow only in the directions extending from the wheel cylinders 7a and 8a towards the master cylinder 1 side. A control unit 24' generates control signals S, Sa, Sb and Q. The control signals S, Sa and Sb are supplied to solenoid portions 4a, 51a and 51b of the valves 4, 50a and 50b, respectively. When the control signals Sa and Sb are "0", the cut-off valves 50a and 50b take positions F in which the conduits at both sides of the valves are made to communicate with each other. When the control signals Sa and Sb are "1", the cut-off valves 50a and 50b take positions G in which the conduits at both sides of the valves are interrupted from each other.

In the first embodiment, the braking forces of all of the wheels 7 to 10 are increased, decreased or maintained constant, at the same time. However, in the second embodiment, the braking forces of the front wheels 7 and 8 can be maintained constant, independently of the braking forces of the rear wheels 9 and 10. Or only one of the front wheels 7 and 8 can be maintained constant.

When the front wheels 7 and 8 are provided with spike tires and the rear wheels 9 and 10 are provided with normal tires, the rear wheels 9 and 10 are more apt to lock. Accordingly, the braking forces of the rear wheels 9 and 10 are decreased, while the braking forces of the front wheels 7 and 8 are maintained constant. In that time, the control signals S, Sa, and Sb are "1", respectively.

When the frictional coefficients of the road are considerably different at both sides, the braking force of the front wheel on the road side of the lower frictional coefficient is decreased, while the braking force of the front wheel on the road side of the higher frictional coefficient is maintained constant.

The other operations and advantages of this embodiment are the same as those of the first embodiment. Further, when the brake pedal 2 is released, at Sa=1, and Sb=1, the pressurized fluid can return though the check valves 52a and 52b, and the conduits 3b and 3c to the master cylinder 1. The pressurized fluid from the other wheel cylinders 9a and 10a can return to the master cylinder 1 in the same manner an the first embodiment.

Next, there will be described an apparatus according to a third embodiment of this invention with reference to FIGS. 4 and 5. Parts in FIG. 4 and FIG. 5 which correspond to those in the second embodiment of FIG. 3, are denoted by the same reference numerals, the description of which will be omitted.

In comparison with the second embodiment, the one cut-off valve 50b and check valve 52b are omitted, while a cut-off valve 53 is connected between the conduit 13 and the input port 14 of the valve apparatus 12'. A control signal Sc from a control unit 24" is supplied to a solenoid portion 53a of the cut-off valve 53. A check valve 54 is connected in parallel with the cut-off valve 53, which permits fluid to flow only in the direction from the valve apparatus 12' to the master cylinder 1.

When the control signal S becomes "1" or "½", the control signal Sc becomes "1", so that the cut-off valve 53 is changed over to the position G. In the above first and second embodiments, the valve ball 43 is closed with the movement of the piston 32 so that the master cylinder 1 side and the wheel cylinder 8a, 9a side are disconnected from each other. However, in this embodiment, they are disconnected electrically. The other operations are the same as in the first and second embodiments.

However, a counter-measure is taken against a failure of the change-over valve 4. If the change-over valve 4 is locked electrically or mechanically in the position C for a for any reason, all of the wheels are never braked in the first embodiment, or all of the wheels except the front right wheel are never braked in the second embodiment.

Thus, the piston 32 remains moved leftwards, and so the valve ball 43 remains seated on the valve seat 47, in the valve apparatus 12. Accordingly, the fluid pressures of the wheel cylinders 8a and 9a remain decreased. The third embodiment can solve this problem.

In the third embodiment, it may be detected that the change-over valve 4 is locked at the position C. For example when the change-over valve 4 is located at the position C for longer than a predetermined time, it is judged that the valve 4 is locked at the position C. With the detection of the locking, the control signal Sc is changed over from "1" into "0". Accordingly, the cut-off valve 53 is changed over to the position F to make the master cylinder 1 communicate with the wheel cylinders 8a and 9a. The fluid pressures can rise independently of the other conduit system. Further, when the control signal Sa for the cut-off valve 50a is made "1" at that time, the braking force of the front right wheel 7 can be maintained constant.

When the brake pedal 2 is released, during the skid-control operation, the pressurized fluid from the wheel cylinders 8a and 9a can return through the check valve 54 into the master cylinder 1. The pressurized fluid from the wheel cylinders 7a and 10a of the other conduit system can return in the same manner as described in the first or second embodiment.

Figure 5:
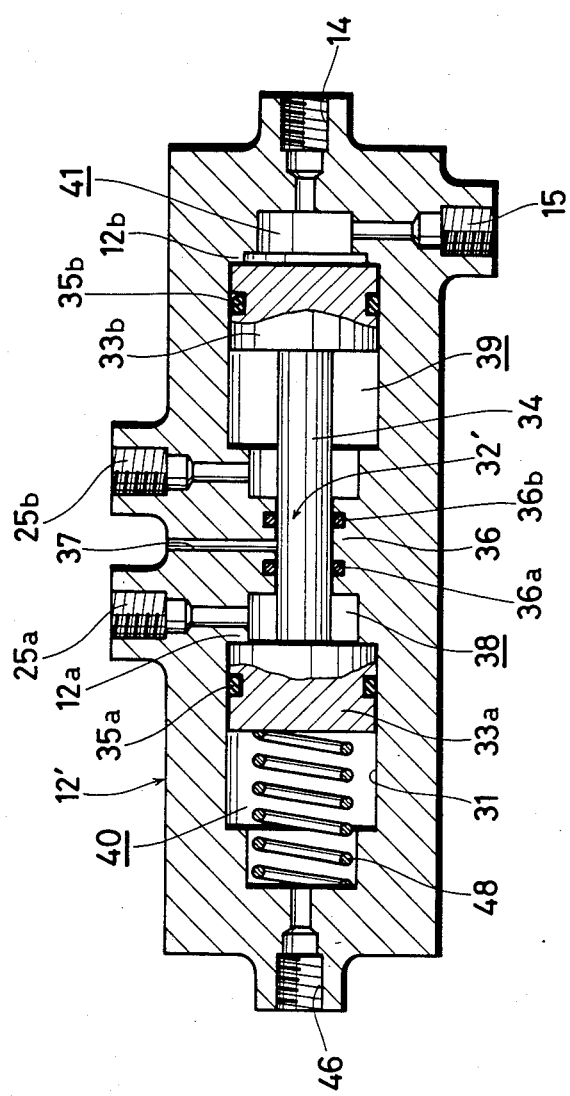
FIG. 5 is an enlarged cross-sectional view of a valve apparatus in FIG. 4.
Figure 6:
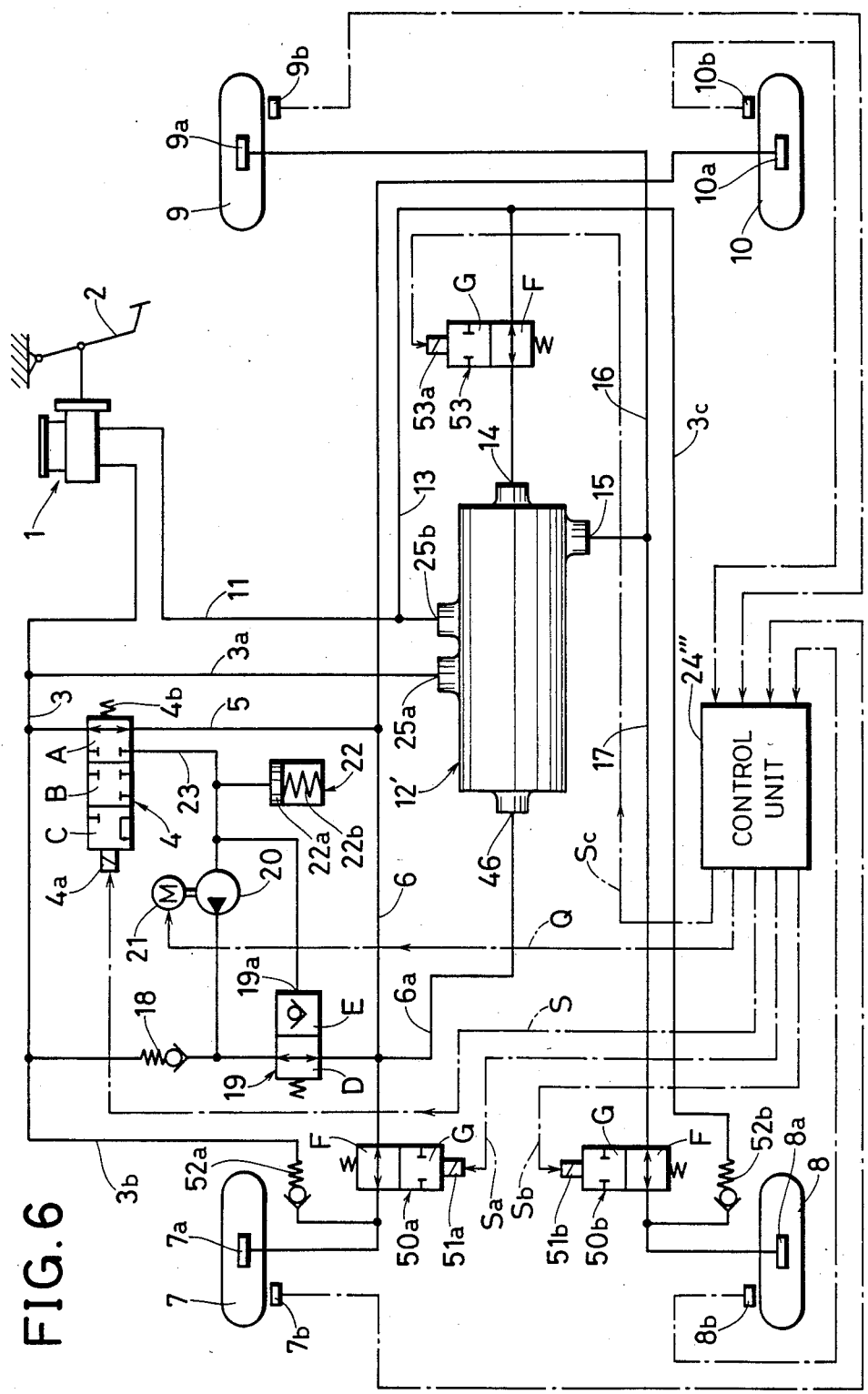
FIG. 6 is a schematic view of an anti-skid control apparatus according to a fourth embodiment of this invention.

FIG. 6 shows an apparatus according to a fourth embodiment of this invention. Parts in FIG. 6 which correspond to those in FIG. 1 to FIG. 5 are denoted by the same reference numerals, the description of which will be omitted. The operations and advantages of this embodiment are substantially the same as those of the first, second or third embodiment.

Figure 3:
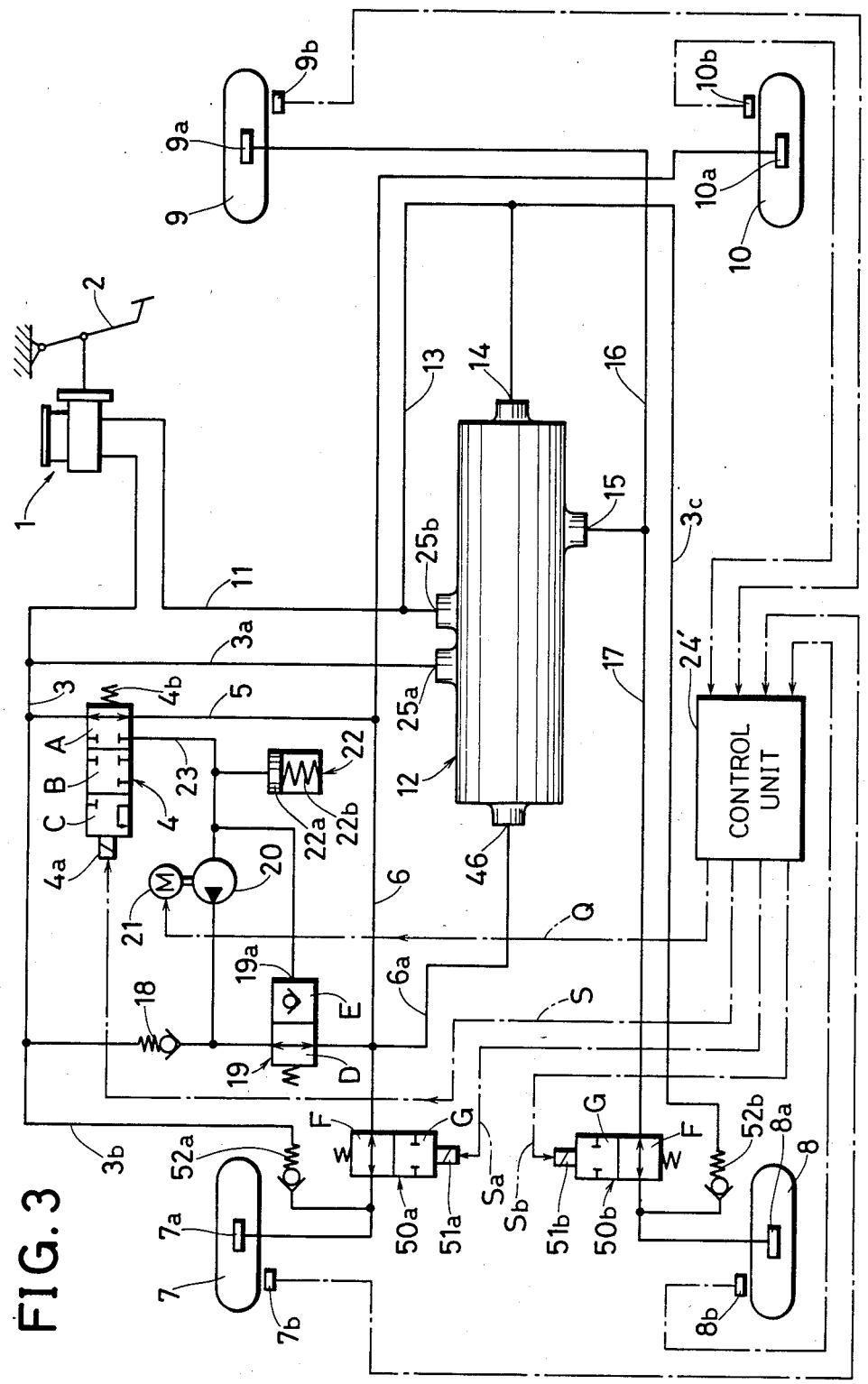
FIG. 3 is a schematic view of an anti-skid control apparatus according to a second embodiment of this invention.
Figure 4:
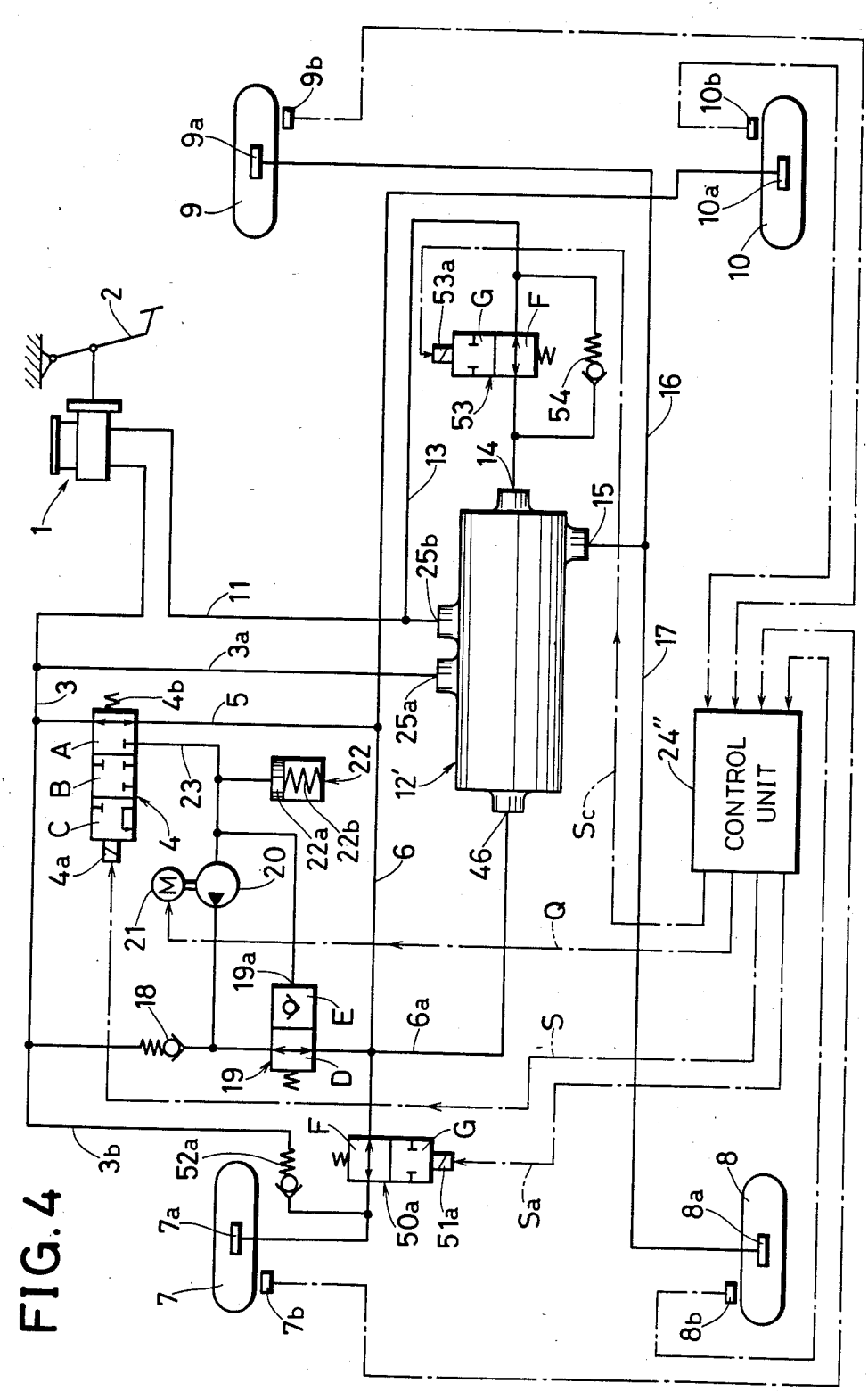
FIG. 4 is a schematic view of an anti-skid control apparatus according to a third embodiment of this invention.

In this embodiment, the cut-off valve 53, shown in FIG. 4 illustrating the third embodiment, is added to the arrangement of the second embodiment of FIG. 3. The cut-off valve 53 is connected between the conduit 13 and the input port 14 of the valve apparatus 12'. The control signal Sc becomes "1" at the time when the control signal S becomes "1" or "½" as in the third embodiment. Thus, the cut-off valve 53 is changed over to the position G.

When the change-over valve 4 is locked at the position C, the cut-off valve 53 is changed to the position F. Thus, the fluid pressures of the wheel cylinders 8a and 9a are increased irrespective of the condition of the conduit system on the side of conduit 5. When the brake pedal 2 is released during the anti-skid operation, the pressurized fluid returns from the wheel cylinder 8a, through the check valve 52b to the master cylinder 1 and the pressurized fluid returns from the wheel cylinder 9a through the valve apparatus 12' and the cut-off valve 53 or through the cut-off valve 50b and the check valve 52b to the master cylinder 1. As in the embodiment of FIG. 4, a check valve which permits fluid to flow only in the direction form the valve apparatus 12' towards the master cylinder 1, may be connected between the input side and output side of the cut-off valve 53.

While the preferred embodiments have been described, variations thereto will occur to those skilled in the art within the scope of the present inventive concepts which are delineated by the following claims.

For example, the check valve 18 and the controllable check valve 19 are arranged for coping with the so-called "H to L" jump, in the above embodiments. However, when the volume of the reservoir 22 is sufficiently larger, they are not always required.

Further, in the above embodiments, when the fluid pressure of the reservoir chamber becomes higher than the predetermined value in the reservoir 22, the controllable check valve 19 is changed over into the position E. Instead, the movement length of the piston 22a of the reservoir 22 may be detected, and when it becomes larger than a predetermined value, the controllable check valve 19 is changed over into the position E.

Further, in the above embodiments, all of the wheels are controlled through the valve apparatus 12 or 12' by the single change-over valve 4. Instead, change-over valves (four channels) may be arranged for the respective wheels, and all of the wheels may be controlled independently of one another.

What is claimed is:

1. An anti-skid control apparatus for a vehicle braking system, comprising:
    (A) master cylinder means, a plurality of wheels, and a wheel cylinder means associated with said wheels;
    (B) a control unit for judging or measuring skid conditions of said wheels;
    (C) fluid pressure control valve means, arranged between said master cylinder means and said wheel cylinder means, receiving instructions from said control unit to control brake fluid pressure of said wheel cylinder means;
    (D) hydraulic reservoir means for reserving brake fluid discharged through said fluid pressure control valve means from said wheel cylinder means to lower said brake fluid pressure of the wheel cylinder means with the control of said fluid pressure control valve means;
    (E) fluid pressure pump means including an inlet means and an outlet means for pressurizing the discharged brake fluid of said hydraulic reservoir means and supplying the pressurized brake fluid into a conduit connecting said master cylinder means with said wheel cylinder means;

(F) said fluid pressure control valve means being movable between at least a first and second position, in said first position said fluid pressure control valve means allows said master cylinder means to communicate with said wheel cylinder means and in said second position said fluid pressure control valve means allows said wheel cylinder means to communicate with said hydraulic reservoir means and interrupts communication between said master cylinder means and said wheel cylinder means, and (G) means for circulating said brake fluid discharged from said wheel cylinder means when said fluid pressure control valve means is in said second position through a path consisting of a first conduit connecting the outlet means of said fluid pressure pump means directly with said wheel cylinder means, a second conduit connecting said wheel cylinder means with said fluid pressure control valve means and a third conduit connecting said fluid pressure control valve means through said hydraulic reservoir means with the inlet means of said fluid pressure pump means, wherein said circulating means includes a controllable check valve arranged in said first conduit connecting the outlet means of said fluid pressure pump means directly with said wheel means, and said hydraulic reservoir means includes a reservoir chamber and a piston, said anti-skid apparatus further comprising a check valve connected in a conduit connecting said master cylinder means and said outlet means of the fluid pressure pump means, said check valve permitting fluid to flow only in the direction from said outlet of the fluid pressure pump means toward said master cylinder means, said controllable check valve normally allowing said fluid pressure pump means and said wheel cylinder means to freely communicate with each other and functioning as a check valve to permit fluid flow only in the direction from said wheel cylinder means toward the outlet means of said fluid pressure pump means when said piston is moved more than a predetermined distance or when fluid pressure becomes higher than a predetermined value in the reservoir chamber of said hydraulic reservoir means.

2. An anti-skid apparatus according to claim 1 in which said wheel cylinder means consists of four wheel cylinders, wherein two of said four wheel cylinders are connected diagonally to one another and the other two of said four wheel cylinders are also connected diagonally to one another, said master cylinder means includes first and second pressure generating chambers, said second pressure generating chamber being connected to said two wheel cylinders by a path, and said anti-skid apparatus further comprises a valve apparatus arranged between said master cylinder means and said two wheel cylinders, said other two wheel cylinders being connected through said fluid pressure control valve means to said master cylinder means, said valve apparatus includes piston means, a valve port for opening and closing a path connecting the other fluid pressure generating chamber of said master cylinder means and said two wheel cylinders, and an output chamber formed between one end of said piston means and said valve part being in constant communication with said two wheel cylinders, said piston means receiving at the other end the fluid pressure of said other two wheel cylinders and being moved in one direction to close said valve part when the fluid pressure of said other two wheel cylinders is decreased by action of said fluid pressure control valve means so that the fluid pressure of said two wheel cylinders is controlled with the change of the volume of said output chamber when interrupted from said master cylinder means.

3. An anti-skid apparatus according to claim 2, in which said piston means includes larger diameter portions or members at either end, each of said portions or members having first and second surfaces, wherein the fluid pressure of said other two wheel cylinders is received at the second surface of one of said portions or members and the fluid pressure of said second fluid pressure generating chamber of said master cylinder means is received at the second surface of the other of said portions or members when said valve port is opened, and the fluid pressures of the first and second fluid generating chambers of said master cylinder means is received at the first surfaces of each of the portions or members.

4. An anti-skid apparatus according to claim 2 in which said two wheel cylinders and or said other two wheel cylinders are connected to each other through a cut-off valve.

5. An anti-skid apparatus according to claim 4, in which said cut-off valve is connected between said master cylinder means and said wheel cylinders, said cut-off valve being connected through a check valve to said master cylinder means such that fluid is permitted to flow only in the direction from the wheel cylinders toward the master cylinder means.

6. An anti-skid apparatus according to claim 1 or 2, in which said wheel cylinder means consists of four wheel cylinders wherein two of said four wheel cylinders are connected diagonally to one another and the other two of said four wheel cylinders are also connected diagonally to one another, said master cylinder means includes a first and second pressure generating chambers, said second pressure generating chamber being connected to said two wheel cylinders by a path, and said apparatus further comprises a valve apparatus arranged between said master cylinder means and the two wheel cylinders, the other two wheel cylinders being connected through said fluid pressure control valve means to said first fluid pressure generating chamber of said master cylinder means, said valve apparatus includes piston means, an output chamber formed at one side of said piston means, an input chamber being formed at the other side of said piston means, said output chambers always being in communication with said two wheel cylinders and through a cut-off valve to the second fluid pressure generating chamber of said master cylinder means, said cut-off valve normally allowing said output chamber and said master cylinder means to communicate with each other and interrupting the communication between said output chamber and said master cylinder means when said fluid pressure control valve means is changed into said second position and said piston means receiving at said input chamber the fluid pressure of said other two wheel cylinders and being moved in one direction when the fluid pressure of said other two wheel cylinders is decreased by action of said fluid pressure control valve means so that the fluid pressure of said two wheel cylinders is controlled with the change of the volume of said output chamber when interrupted from said master cylinder means.

7. An anti-skid apparatus according to claim 6, in which said piston means includes larger diameter portions or members at either end, each of said portions or members having first and second surfaces, wherein the fluid pressures of said input and output chambers are received at respective ones of said surfaces and the fluid pressures of said first and second fluid pressure generating chambers of said master cylinder means at respective other ones of said surfaces.

8. An anti-skid apparatus according to claim 7 in which said two wheel cylinders and or said other two wheel cylinders are connected to each other through a second cut-off valve.

9. An anti-skid apparatus according to claim 8, in which said second cut-off valve is connected between said master cylinder means and said wheel cylinders, said second cut-off valves being connected through a check valve to said master cylinder means such that fluid is permitted to flow only in the direction from the wheel cylinders towards the master cylinder means.

* * * * *